N. E. WOODS.
DRILL SOCKET.
APPLICATION FILED OCT. 27, 1911.
1,019,110.
Patented Mar. 5, 1912.
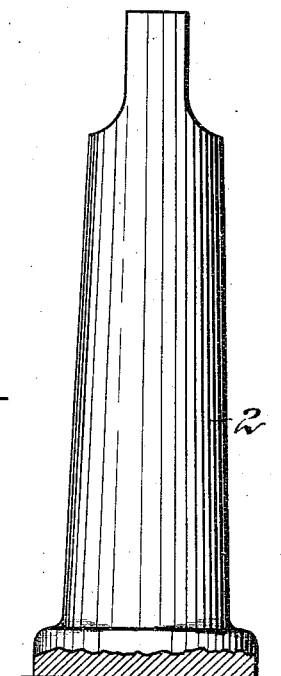
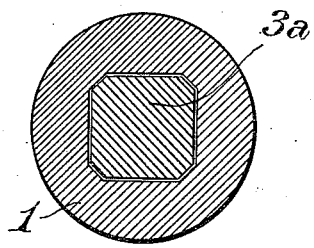
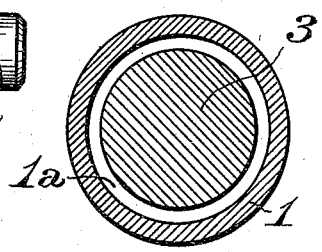
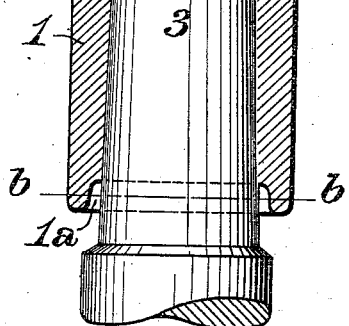
WITNESSES
INVENTOR
Norman E. Woods,

UNITED STATES PATENT OFFICE.

NORMAN E. WOODS, OF RICHMOND, VIRGINIA.

DRILL-SOCKET.

1,019,110.  Specification of Letters Patent.  Patented Mar. 5, 1912.

Application filed October 27, 1911.  Serial No. 657,090.

*To all whom it may concern:*

Be it known that I, NORMAN E. WOODS, of Richmond, in the county of Henrico and State of Virginia, have invented a certain new and useful Improvement in Drill-Sockets, of which improvement the following is a specification.

My invention relates to drill sockets of the class or type having a tapered bore for the reception of a correspondingly tapered shank on a drill, an instance of which is exemplified in Letters Patent of the United States No. 894,250, granted and issued to me under date of July 28, 1908.
The object of my invention is to provide simple and effective means for insuring the true and accurate bearing of the drill shank in the drill socket, by preventing its fit in the bore of the latter from being impaired by battering or deformation of the drill socket in driving it on the drill press spindle.

The improvement claimed is hereinafter fully set forth.

In the accompanying drawing: Figure 1 is a view, partly in elevation and partly in longitudinal central section, of a drill socket and part of a drill fitted therein, illustrating the application of my invention, and; Figs. 2 and 3, transverse sections through the same, on the lines $a\ a$ and $b\ b$, respectively, of Fig. 1.

The drill socket herein set forth, corresponds, except as to my present invention hereinafter described, with that of Letters Patent No. 894,250 aforesaid, having a cylindrical body, 1, provided with a tapered central bore for the reception of the shank of a drill, and a tapered shank, 2, adapted to be fitted in a corresponding bore in a drill press spindle, in the usual manner. The drill shank, 3, is tapered in correspondence with the bore of the drill socket, and is provided, at its top, with a tang, $3^a$, of quadrangular section, which fits in a socket of corresponding section, adjacent to the top of the body, 1, of the drill socket, and prevents the drill shank from turning therein.

As is well known to those skilled in the art to which my invention relates, it frequently happens that the open end of the bore of a drill socket becomes battered or jammed, around its edge, in driving the drill socket into position on the spindle of the drill press on which it operates, from which deformation it results that the drill shank cannot be driven sufficiently far up into the socket to enable it to be brought to a full and true bearing thereon and to obtain the full fit of the tang of the drill shank in its quadrangular seat. In the practice of my invention, this objection, which is a serious one, is fully overcome by the provision of a bell mouth or annular recess, $1^a$, which is formed in the tapered bore of the drill socket, at, and extending outwardly for a short distance from, its outer end. By reason of the greater resultant diameter of the outer end of the bore, any deformation of this portion of it which may be made in driving the drill socket on to the drill press spindle, will be entirely clear of the periphery of the drill shank, and the prejudicial effect of such deformation, on the fit of the drill shank in the socket, which is exerted in the ordinary construction, will be entirely obviated.

I claim as my invention, and desire to secure by Letters Patent:

A drill socket having a tapered bore for the reception of a drill shank, and a bell mouth or annular recess at and adjoining the outer end of said bore.

NORMAN E. WOODS.

Witnesses:
R. C. DUKE,
F. F. RENNIE.

---

Copies of this patent may be obtained for five cents each, by addressing the "Commissioner of Patents, Washington, D. C."